July 2, 1929.　　　M. WATTER　　　1,719,798

AEROPLANE AND LANDING CHASSIS THEREFOR

Filed March 21, 1928　　　2 Sheets-Sheet 1

INVENTOR
Michael Watter,
BY  Eyre Scott & Keel
ATTORNEYS

July 2, 1929.  M. WATTER  1,719,798
AEROPLANE AND LANDING CHASSIS THEREFOR
Filed March 21, 1928  2 Sheets-Sheet 2
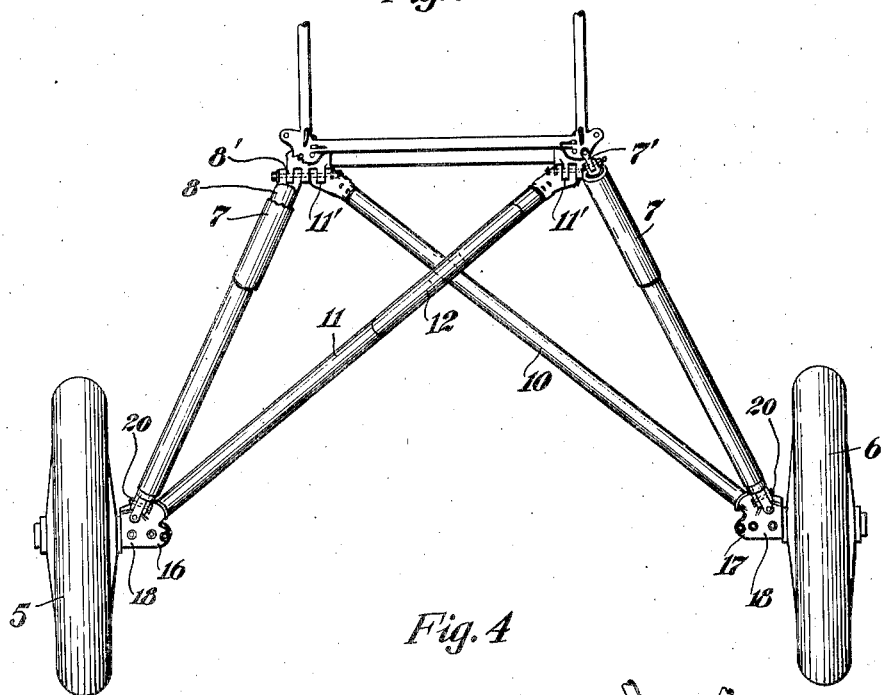
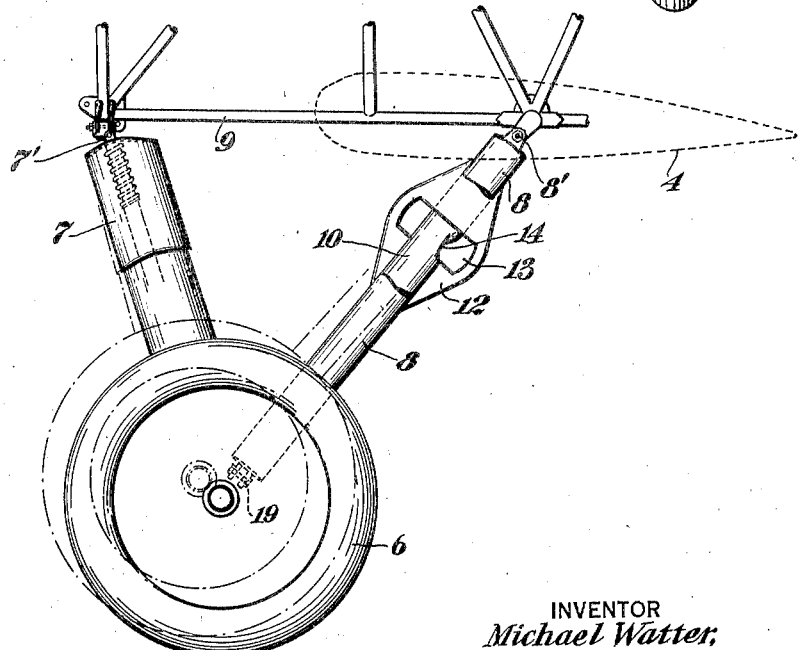
INVENTOR
Michael Watter,
BY Eyre Scott & Keel
ATTORNEYS Patented July 2, 1929.

1,719,798

UNITED STATES PATENT OFFICE.

MICHAEL WATTER, OF NEW YORK, N. Y., ASSIGNOR TO CHANCE M. VOUGHT, OF GREAT NECK, NEW YORK.

AEROPLANE AND LANDING CHASSIS THEREFOR.

Application filed March 21, 1928. Serial No. 263,388.

This invention relates to aeroplanes and particularly to landing gear therefor.

One object of the invention is a landing gear unit which may be used interchangeably on different types of aeroplanes, as for example a gear which may be readily substituted for the floats of seaplanes, rendering such planes readily convertible from one type to another. A further object is a gear having a four point support with the bottom of the fuselage or other part of the craft instead of the usual standard five or six point support in common practice with divided axle landing gears with an appreciable saving in net weight as compared with such practice where stub wings or special structures projecting laterally from the fuselage are required for supporting the struts, and moreover of such a construction and arrangement as to substantially retain the favorable relative angular positioning of the landing gear struts. A further object is a landing gear of the above indicated character embodying such construction and relative arrangement of shock absorber struts and rigid struts that the wheels yield and move freely and independently of each other but only in a substantially fore and aft direction when landing and while taxiing, and therefore being non-steering. To this end each wheel is independently carried by a pair of rigid struts which are pivotally and swivelly connected to the craft on an axis parallel to the wheel axis with a third and resilient carrying strut pivotally connected with the craft at a point removed in a fore and aft direction from the pivotal axis of the other struts, and in the particular embodiment herein illustrated the rigid struts are pivoted to the craft on the same axis. A still further object is a gear unit of few and simple parts, rugged and durable, and one which may be economically manufactured.

For a better understanding of the invention, reference may be had to the accompanying drawings containing one embodiment of the invention, wherein—

Fig. 3 is a front view of the landing gear, and

Fig. 4 is a side view thereof.

Figure 1:
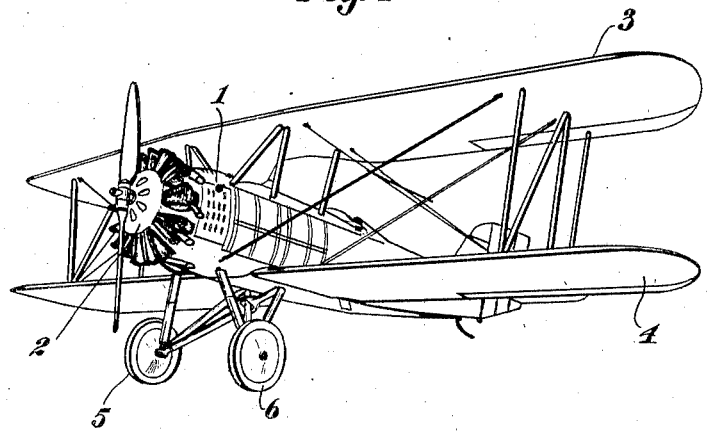
Fig. 1 is a three-quarter front view of an aeroplane embodying my invention.
Figure 2:
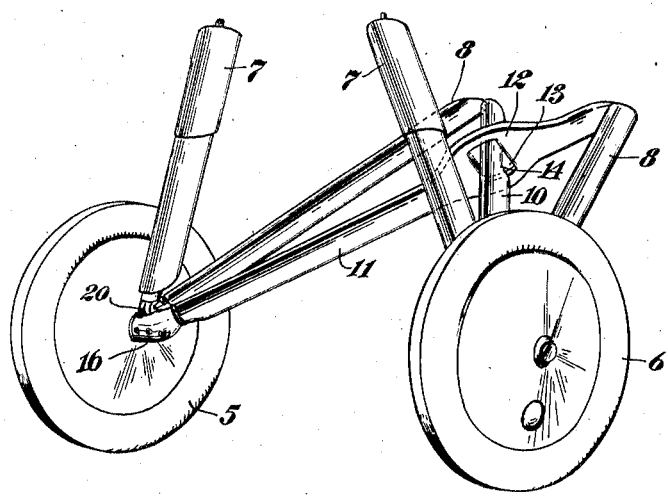
Fig. 2 is an enlarged view of the gear alone corresponding to Fig. 1.

I have indicated my invention as embodied in an aeroplane including a main body or fuselage 1, a motor or power plant 2, and a biplane including the upper and lower wings 3 and 4 respectively. The landing gear includes a pair of independently yieldable wheels 5 and 6, each of these wheels being carried off to one side of the fuselage 1 by three struts. These include the forward struts 7 which extend upwardly and forwardly and are connected to the opposite sides of the bottom of the fuselage 1 at points forward of the wings 3 and 4 and rear struts 8 which extend upwardly and rearwardly and are connected with the opposite sides of the bottom of the fuselage at points substantially midway of the fore and aft edges of the wing 4. The struts 7 and 8 are connected to the bottom longérons 9 of the fuselage and are pivoted thereto on substantially horizontal and transverse pivots to permit the wheels carried thereby to yield and move only in a substantially fore and aft direction in a vertical plane, two of these struts, as for example the forward struts 7, being of standard shock absorbing character, the pivot points of the struts 7 and 8 being indicated at 7' and 8' respectively. Each wheel is carried by a side pair of struts 7 and 8 which are attached to a bottom longéron 9 of the fuselage, and a third strut, which extends rearwardly and laterally of the wheel and is connected to the opposite side of the fuselage adjacent the pivotal point 8' on that side. For example, the third strut carrying the wheel 6 is indicated at 10 and the third strut carrying the wheel 5 is indicated at 11, these struts 10 and 11 extending rearwardly and laterally from the wheels 6 and 5 respectively, and being pivotally connected to the bottom of the fuselage at 11' at or adjacent the pivotal points 8' of the outer struts 8 for fore and aft swinging of the struts. The connections 11' are firm and rigid swivel connections permitting only the fore and aft swivelling movements of the struts 10 and 11, and the latter are rigidly connected at their lower ends to, or form continuations of the stub axles 18 of the wheels. The struts 8 are connected with the axles 18 by means of inclined pivotal connections 19. The struts 7 are connected at their lower ends by means of universal connections 20 to the axles 18 for free fore and aft pivoting movements of the latter, and likewise the pivots 7' are universal connections corresponding to the connections 20. I have, therefore, a landing gear supported at four points or stations on the bottom of the fuselage, namely, the points 7' and 8', the pivots 8' and 11' on a side being practically one station, and comprising in fact a single pivot pin carried by a single bracket. The pivots 11' and pivotal connections at 7' and 8' permit the three struts carrying a wheel to pivot in a fore and aft direction to carry the wheel only in a substantially vertical plane, as indicated, for example, in dotted lines in Fig. 4. The rear struts 10, 11 and 8 are normally disposed in a plane including the axis of the wheels and the pivotal points 8', and when one wheel yields independently of the other, as it may, and does in practice, this coplanar arrangement of the rear struts no longer exists and, accordingly, I have provided a special offset arrangement of the struts 10 and 11, which permits them to pivot in a fore and aft direction independently of each other. For example, I have indicated the strut 11 as being enlarged or widened at the point 12 where the strut 10 crosses the strut 11, a transverse slot 13 being provided in this widened part 12 of the strut 11 to accommodate the strut 10 which passes freely therethrough, this slot 13 permitting the independent fore and aft pivoting movements of these two struts 10 and 11. In the particular embodiment illustrated I have shown the strut 10 as cut away on its rear side 14 to function with the slot 13 of the strut 11 in permitting the independent fore and aft pivoting movement of the two struts. Each wheel is prevented from lateral spread by its corresponding pair of rear struts,—for example, the wheel 6 is prevented from such lateral spread by means of its rear struts 8 and 10, which diverge upwardly and connect with the opposite sides of the bottom of the fuselage, and similarly, the wheel 5 is prevented from lateral movement by means of its pair of rear struts 8 and 11, which diverge and connect with the opposite sides of the bottom of the fuselage. I have shown connecting points on the stub axles of the wheels at 16 and 17 to provide for the connection of a jury strut as for example for use in landing on shipboard. Each pair of side struts 7 and 8 extends downwardly and outwardly from the lower longéron 9 of the fuselage convergingly to its corresponding wheel to provide for as large a tread as possible with due regard to a favorable angle between the pairs of rear struts 8 and 10 and 8 and 11. The relative angular arrangement indicated of the struts 7 and 8 in the fore and aft direction has also proven in practice to be particularly satisfactory.

The operation of the gear is apparent from the above description, each wheel 5 and 6 being independently yieldable only in a fore and aft direction and in a substantially vertical plane, and the objectionable steering functions of prior gears of this general type being thereby avoided.

I have thus provided two independent single wheeled landing gears with three supporting struts for each wheel, one being a shock absorber strut, in which both gears are supported underneath the bottom of the fuselage at only four points or stations. The employment of stub wings or special supporting parts extending laterally from the fuselage are not necessary for supporting the landing gear and accordingly there is an appreciable gain in the net weight since the landing gear struts with the particular favorable angular disposition and arrangement shown can be designed without substantially increasing the weight thereof to take care of the landing forces, and moreover, notwithstanding the special arrangement shown, the wheels may be pivoted in a fore and aft direction freely and independently of each other in response to the give of the shock absorber struts. Each of the landing wheels and its supporting struts may be readily detached from the fuselage by disconnecting at the points 7', 8' and 11', and the machine thereby readily converted to a seaplane by the attachment of a seaplane float, and similarly such seaplane can be readily re-converted back to a land plane.

While I have illustrated as the preferred form of my invention the support of the independently mounted chassis at four points or stations on the craft, it is understood that certain of the advantages of my invention may be obtained with five and six point supports with the craft, as for example the advantage of the fore and aft movements of the wheels in vertical planes with no lateral spread and the desirable non-steering function of the wheels thereby obtained which is of considerable importance in certain types of aircraft. For example this advantage may be obtained by the pivotal and swivelling anchorage of the outer struts 8 to the wing beams with the forwardly extending struts 7 universally attached either to the fuselage longéron or to the front wing beam and the rigid struts 10 and 11 connected with the bottom of the fuselage at an intermediate point or points or to the adjacent longérons 9 respectively, the pairs of rigid struts 8 and 10 and 8 and 11 respectively being pivoted and swiveled to the craft on substantially transverse axes parallel to the wheel axes.

It is understood that while I have shown in the preferred embodiment wheel chassis, certain of the advantages of my invention may be obtained by the use of skids as the landing or alighting elements, instead of the wheels.

I claim:

1. An aeroplane including a divided axle landing gear unit, each divided part of the landing chassis including a pair of upwardly diverging rigid struts pivotally and swivelly connected with the craft on a transverse horizontal axis parallel with the wheel axis so as to prevent any lateral movement and to obtain fore and aft movements of the wheel in a vertical plane, together with a third and resilient strut pivotally connected with the craft to yieldingly hold the gear in its operative position.

2. In an aeroplane of the character set forth in claim 1 wherein the two pairs of rigid struts are pivotally and swivelly connected with the craft by means of a pair of laterally spaced fittings.

3. An aeroplane including a fuselage and a readily detachable landing gear including a pair of independently yielding and movable units with six upwardly diverging struts, three for each unit, four of the six struts being connected to the opposite sides of the bottom of the fuselage at two common connecting points and mounted for movement about common transverse axes to provide for true fore and aft movements of the units in vertical planes with no lateral movement, said four struts being co-planar disposed with the two inner struts offset at the point where they cross to permit the full co-planar disposition thereof and the independent fore and aft pivoting movements of each unit with reference to the other.

4. An aeroplane of the character set forth in claim 3 wherein the four co-planar disposed struts are connected to the opposite sides of the bottom of the fuselage by means of two single fittings, each fitting having a common pivotal axis for the two struts connected therewith.

5. In an aeroplane of the character set forth in claim 3 wherein the two points of connection of the four co-planar struts are disposed rearwardly with respect to the connections of the other two struts, the latter being of yielding character in the direction of their length and being connected to the opposite sides of the fuselage.

6. An aeroplane of the character set forth in claim 3 wherein the forward and rearward outer struts of a unit extend downwardly and outwardly with reference to the fuselage and are inclined to the vertical.

7. An aeroplane including a fuselage and a readily detachable landing gear including a pair of independently yielding and movable wheel units, with six upwardly diverging struts, three for each unit, supporting the wheels at their lower ends and connected with the bottom of the fuselage at their upper ends, at only four points, four of the six struts being connected to the opposite sides of the bottom of the fuselage at two common connecting points upon axes at the same level for independent fore and aft pivoting movements, said four struts being co-planar disposed with the two inner struts offset at the point where they cross to permit a full co-planar disposition thereof and the independent fore and aft pivoting movements of each unit with reference to the other about their common points of attachment.

8. An aeroplane of the character set forth in claim 7 wherein the wheel axles have connections for attachment of a jury axle.

In testimony whereof, I have signed my name to this specification.

MICHAEL WATTER.